US012080124B2

(12) United States Patent
Ikeda et al.

(10) Patent No.: US 12,080,124 B2
(45) Date of Patent: Sep. 3, 2024

(54) INFORMATION PROCESSING APPARATUS, INFORMATION PROCESSING METHOD, AND PROGRAM FOR PERFORMING TARGET BETTING

(71) Applicant: mixi, Inc., Tokyo (JP)

(72) Inventors: Takeshi Ikeda, Tokyo (JP); Hirotake Teruuchi, Tokyo (JP)

(73) Assignee: Mixi, Inc., Tokyo (JP)

( * ) Notice: Subject to any disclaimer, the term of this patent is extended or adjusted under 35 U.S.C. 154(b) by 291 days.

(21) Appl. No.: 17/764,492

(22) PCT Filed: Jun. 15, 2020

(86) PCT No.: PCT/JP2020/023406
§ 371 (c)(1),
(2) Date: Mar. 28, 2022

(87) PCT Pub. No.: WO2021/065089
PCT Pub. Date: Apr. 8, 2021

(65) Prior Publication Data

US 2022/0351569 A1 Nov. 3, 2022

(30) Foreign Application Priority Data

Sep. 30, 2019 (JP) ................................ 2019-178520

(51) Int. Cl.
*G07F 17/32* (2006.01)
*G06Q 50/34* (2012.01)

(52) U.S. Cl.
CPC ........... *G07F 17/323* (2013.01); *G06Q 50/34* (2013.01); *G07F 17/3288* (2013.01)

(58) Field of Classification Search
CPC .... G07F 17/323; G07F 17/3288; G06Q 50/34
See application file for complete search history.

(56) References Cited

U.S. PATENT DOCUMENTS 7,454,380 B2 * 11/2008 Garahi .................. G06Q 50/34 463/16
2008/0081684 A1 * 4/2008 Lutnick ................ A63F 3/0434 463/16

(Continued)

FOREIGN PATENT DOCUMENTS

JP 2001188847 A 7/2001
JP 2006-085442 A 3/2006

(Continued)

OTHER PUBLICATIONS

International Search Report of Application No. PCT/JP2020/023406, mailed Sep. 15, 2020, 2 pages.

*Primary Examiner* — Omkar A Deodhar
*Assistant Examiner* — Shauna-Kay Hall
(74) *Attorney, Agent, or Firm* — PROCOPIO, CORY, HARGREAVES & SAVITCH LLP

(57) ABSTRACT

An information processing method for performing target betting comprising a step of accepting tip information including betting targets and types of betting from a plurality of first players; a step of transmitting, to an information processing apparatus to be utilized by a second player, data of a video including a plurality of flip boards on which respective information of the plurality of first players is displayed and position information indicating positions where the plurality of flip boards are displayed, the position information is displayed on a screen of the information processing apparatus; a step of accepting tip information selected by the second player among the tip information of each of the plurality of first players, from the information processing apparatus; and a step of performing betting of the second player on a basis of a betting target and a type of betting corresponding to the selected tip information.

8 Claims, 8 Drawing Sheets

(56) References Cited

U.S. PATENT DOCUMENTS

| | | | | |
|---|---|---|---|---|
| 2017/0017657 | A1* | 1/2017 | English | G07F 17/3211 |
| 2017/0032621 | A1* | 2/2017 | Emura | G07F 17/3288 |
| 2020/0334955 | A1* | 10/2020 | Carli | G07F 17/3262 |

FOREIGN PATENT DOCUMENTS

| | | | |
|---|---|---|---|
| JP | 2008-033539 | A | 2/2008 |
| JP | 2008282202 | A | 11/2008 |
| JP | 2010-160612 | A | 7/2010 |
| JP | 2016-184382 | A | 10/2016 |

* cited by examiner

FIG. 4

<USER MANAGEMENT DB> 100a

| USER ID | NICKNAME | POSSESSED VALUE | BETTING HISTORY |
|---|---|---|---|
| U100 | aaa | 1,000 YEN | FIRST RACE: TICKET C: 100 YEN<br>SECOND RACE: TICKET A: 100 YEN<br>... |
| U101 | bbb | 2,000 YEN | ... |
| U102 | ccc | 5,000 YEN | ... |
| ... | ... | ... | ... |

<TIPSTER MANAGEMENT DB> 100b

| TIPSTER ID | NICKNAME | POSSESSED VALUE | TIP | TIP ACCEPTANCE TIME | BETTING HISTORY |
|---|---|---|---|---|---|
| C100 | TEAM A | 53,200 YEN | FIFTH RACE<br>•WIN (3): 500 YEN<br>•EXACTA (3-5): 200 YEN<br>•EXACTA (3-1): 200 YEN | FIFTH RACE :15:05:20 | FIRST RACE: TICKET A 500 YEN.<br>TICKET B 500 YEN.<br>TICKET D 1,000 YEN..<br>SECOND RACE: TICKET C 1,000 YEN,<br>TICKET E 500 YEN..<br>... |
| C101 | TEAM B | 105,500 YEN | FIFTH RACE<br>•WIN (7): 200 YEN<br>•EXACTA (2-7): 300 YEN | FIFTH RACE : 15:20:05 | ... |
| C102 | TEAM C | 30,200 YEN | FIFTH RACE<br>•QUINELLA (3-4): 200 YEN<br>•QUINELLA (1-5): 200 YEN | FIFTH RACE : 15:10:00 | ... |
| ... | ... | ... | ... | ... | ... |

INFORMATION PROCESSING APPARATUS, INFORMATION PROCESSING METHOD, AND PROGRAM FOR PERFORMING TARGET BETTING

CROSS-REFERENCE TO RELATED APPLICATION

This application is a U.S. National Stage of International Patent Application No.: PCT/JP2020/023406, filed June 15, 2020 and is based on Japanese Patent Application No. 2019-178520 filed on Sep. 30, 2019, the descriptions of which are incorporated herein by reference.

TECHNICAL FIELD

The present invention relates to an information processing apparatus, an information processing method, and a program.

BACKGROUND ART

In various kinds of races in which betting is performed, such as horse racing, bicycle racing and motorboat racing, a betting apparatus which accepts betting from a backer is used. The backer can make a bet by writing details of betting necessary for betting in a betting card and inputting the details of betting in the betting apparatus. For example, in a case of horse racing, the backer can make a bet by writing details such as a race site where the race is to be held, a type of betting such as win and place, a horse to be bet on, and the like, in the betting card and inputting the details of betting in the betting apparatus. For example, Patent Literature 1 discloses a technique which can facilitate purchase of a betting ticket using a mark card.

CITATION LIST

Patent Literature

Patent Literature 1: Japanese Patent Laid-Open No. 2008-033539

SUMMARY OF INVENTION

However, a method for betting employed in the above-described races is complicated, which is difficult for a novice user. For example, in a case of horse racing, bicycle racing, motorboat racing, and the like, the method for betting is complicated because the user needs to select a type of betting and a horse or a racer as a betting target among a number of betting patterns. It is considered that this is one factor of keeping a user who has no experience or little experience in betting away from the betting.

The present invention is therefore directed to providing a technique of enabling even a user having little experience in betting to easily make a bet.

An information processing apparatus according to one aspect of the present invention is an information processing apparatus that executes processing regarding betting on a betting target, the information processing apparatus including a first acceptance unit configured to accept designation of betting targets and types of betting from one or more first players, a transmission unit configured to transmit data of a video including one or more pieces of tip information in which information specifying the first players is associated with the betting targets and the types of betting accepted from the first players, to another information processing apparatus to be utilized by a second player, a second acceptance unit configured to accept tip information selected by the second player among the one or more pieces of tip information included in the video, from the other information processing apparatus, and a betting processing unit configured to perform betting of the second player on the basis of a betting target and a type of betting corresponding to the selected tip information.

Advantageous Effect of Invention

According to the present invention, it is possible to provide a technique of enabling even a user having little experience in betting to easily make a bet.

BRIEF DESCRIPTION OF DRAWINGS

FIG. 4 illustrates an example of a user management DB and a tipster management DB according to the first embodiment.

DESCRIPTION OF EMBODIMENTS

Figure 1:
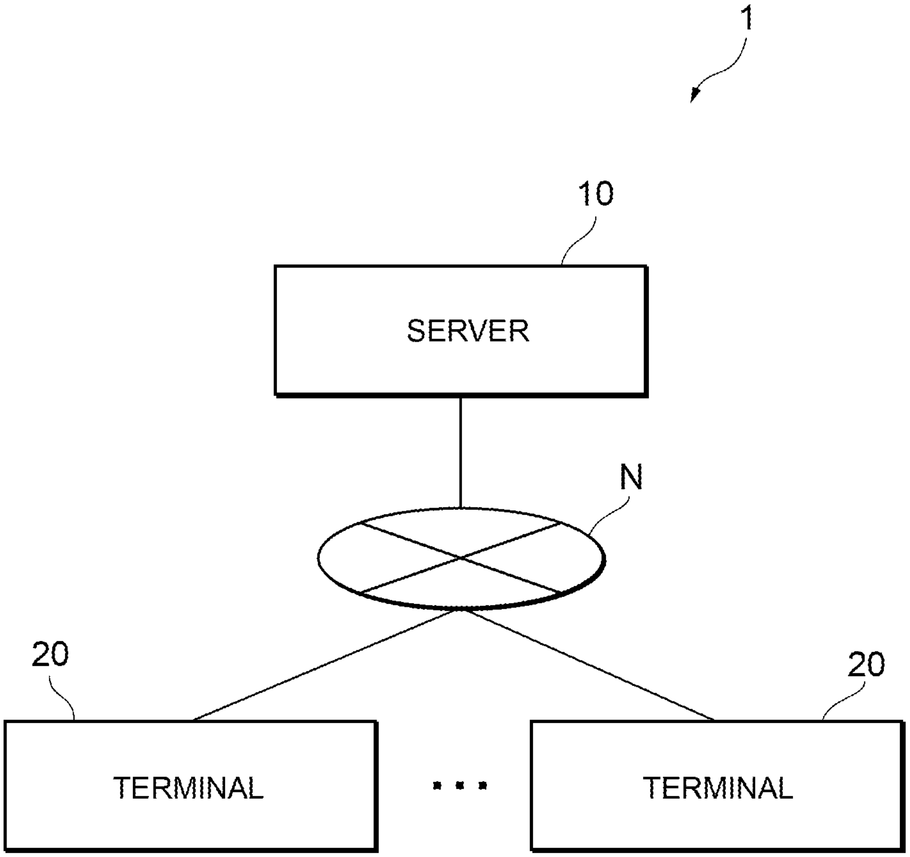
FIG. 1 is a diagram illustrating an example of a system configuration of a betting system according to a first embodiment.

Embodiments of the present invention will be described with reference to the accompanying drawings. Note that in the respective drawings, components to which the same reference numerals are assigned have the same or a similar configuration.

First Embodiment

<System Configuration>

FIG. 1 is a diagram illustrating an example of a system configuration of a betting system 1 according to a first embodiment. The betting system 1 illustrated in FIG. 1 includes a server 10 (computer) and one or more terminals 20 (computers). The server 10 and the terminal 20 are connected via a communication network N such as the Internet, an intranet, a wireless LAN and mobile communication so as to be able to perform communication with each other. The server 10 and the terminal 20 may be referred to as information processing apparatuses.

The server 10 may be constituted with one or a plurality of physical servers, or the like, or may be constituted using a virtual server which operates on a hypervisor or may be constituted using a cloud server. The terminal 20 is a terminal to be utilized by a user, and the user can bet on a betting target by operating the terminal 20. The terminal 20 is, for example, a mobile phone (including a smartphone), a tablet terminal, a personal computer, or the like.

The server 10 executes various kinds of processing such as management of a betting target to be tipped and to be bet on by a tipster, a type of betting and a predetermined value, management of a betting target to be tipped and to be bet on by the user, a type of betting and a predetermined value, management of a predetermined value possessed by the user or the tipster, management of an amount of refund (payout) in accordance with a result of a race, or the like, in various kinds of races in which betting is performed, such as bicycle racing, horse racing, motorboat racing and autoracing.

The tipster may be any person and may be, for example, a group including a plurality of people or may be one person. Further, the tipster may be a famous person such as an artist or may be an unknown common person. Further, the tipster is not necessarily limited to an actual person and may be a virtual person created by computer simulation.

The betting target is a racer (including a player and an animal) who takes part in the race. For example, in a case of a race in which first to fifth racers compete, each of the first to the fifth racers becomes the betting target.

The type of betting is a method for betting a predetermined value on the betting target. For example, win is a method for betting a predetermined value on a betting target which is predicted to win, and place is a method for betting a predetermined value on a betting target which is predicted to win, finish second or third. Exacta is a method for betting predetermined values on betting targets which are predicted to finish first and second in correct order, and quinella is a method for betting predetermined values on two betting targets which are predicted to finish first and second (in any order). Trifecta is a method for betting predetermined values on betting targets which are predicted to finish first, second and third in correct order, and trio is a method for betting predetermined values on three betting targets which are predicted to finish first, second and third (in any order). The types of betting according to the first embodiment include types of betting other than these methods.

In the first embodiment, a target which is uniquely determined by a type of betting and a betting target being designated, and on which a predetermined value can be bet, will be referred to as a "betting ticket". The betting ticket may be issued in print form or may be data to be managed within the betting system 1. Examples of the betting ticket can include a betting ticket of exacta of selecting number 1 to finish first and number 5 to finish second, and a betting ticket of trio for number 5, 7 and 8. In the first embodiment, "a user or a tipster purchasing a betting ticket" is synonymous with "a user or a tipster betting a predetermined value on the selected type of betting and betting target".

The predetermined value may be a value which can be bet on the betting target and may be, for example, money or points. The points may be able to be utilized in a predetermined service or game as well as being bet. Further, the points may be, for example, points (charge-free points) which can be received by a user who utilizes a predetermined service or plays a predetermined game with no charge in the predetermined service or game or may be points (paid points) which can be received in exchange for payment of money (charge) within the predetermined service or game. The predetermined value may be simply referred to as a "value".

In a case where the user and the tipster won with the betting ticket as a result of a race, the user and the tipster can accept a payout of a predetermined value. For example, in a case where the user and the tipster won with a betting ticket of three times, the user and the tipster can accept a payout of a predetermined value three times as much as the bet predetermined value.

In the first embodiment, the user can watch a video (a video, a distributed video) of an aspect where the tipster tips a race result, the tipster explains his/her tip, or the like, which is captured in real time, on a screen of the terminal 20, so that the user can have an experience in enjoying the race together with the tipster. Further, an image of a betting ticket of the tipster is displayed in the video or displayed in a superimposed manner on the video on the screen of the terminal 20. The user can purchase a betting ticket which is the same as the betting ticket of the tipster by touching the image, or the like.

In the following description, purchase of a betting ticket which is the same as the betting ticket of the tipster by the user will be expressed as the user "sharing" with the tipster. Further, in the first embodiment, "tip" includes both meaning of tipping a betting target which finishes in higher ranks to purchase a betting ticket and meaning of only tipping a betting target which finishes in higher ranks without purchasing a betting ticket.

<Hardware Configuration>

Figure 2:
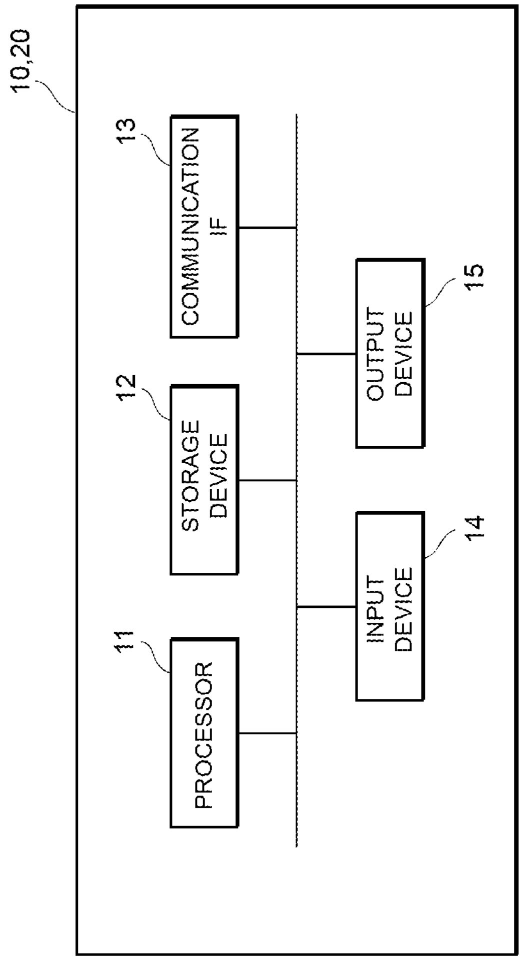
FIG. 2 is a diagram illustrating a hardware configuration example of a server according to the first embodiment.

FIG. 2 is a diagram illustrating a hardware configuration example of the server 10 according to the first embodiment. The server 10 includes a processor 11 such as a central processing unit (CPU) and a graphical processing unit (GPU), a storage device 12 such as a memory, a hard disk drive (HDD) and/or a solid state drive (SSD), a communication interface (IF) 13 which performs wired or wireless communication, an input device 14 which accepts input operation, and an output device 15 which outputs information. The input device 14 is, for example, a keyboard, a touch panel, a mouse and/or a microphone, or the like. The output device 15 is, for example, a display and/or a speaker, or the like.

<Functional Block Configuration>

Figure 3:
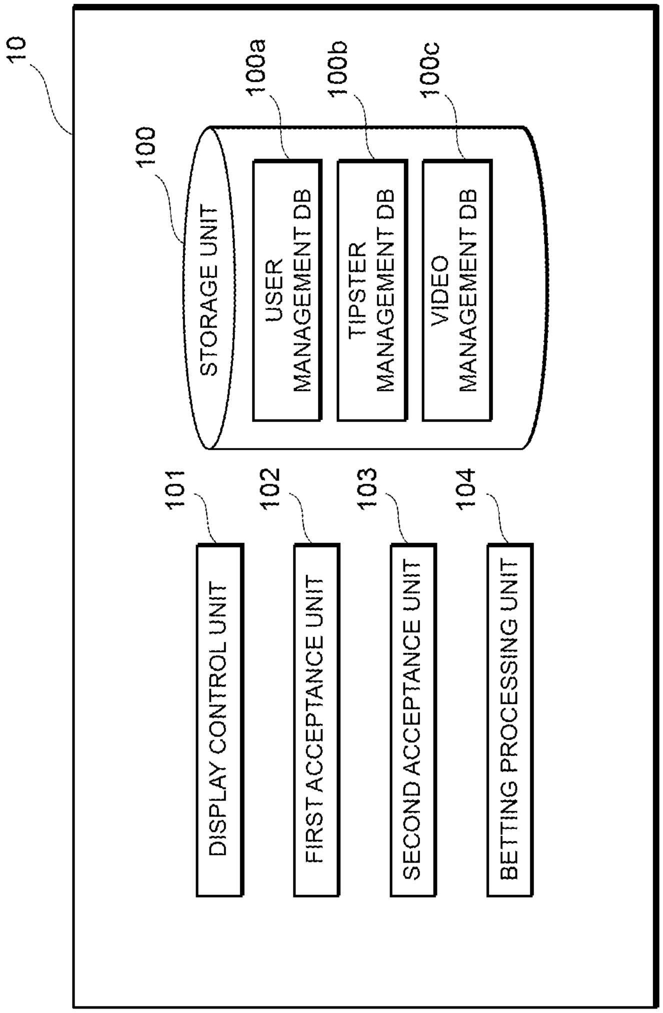
FIG. 3 is a diagram illustrating a functional block configuration example of the server according to the first embodiment.

FIG. 3 is a diagram illustrating a functional block configuration example of the server 10 according to the first embodiment. The server 10 includes a storage unit 100, a display control unit 101, a first acceptance unit 102, a second acceptance unit 103 and a betting processing unit 104. The storage unit 100 can be implemented using the storage device 12 provided at the server 10. Further, the display control unit 101, the first acceptance unit 102, the second acceptance unit 103 and the betting processing unit 104 can be implemented by the processor 11 of the server 10 executing a program stored in the storage device 12. Further, the program can be stored in a storage medium. The storage medium in which the program is stored may be a non-transitory computer readable medium. The non-transitory storage medium is not particularly limited but may be, for example, a storage medium such as a USB memory and a CD-ROM.

The storage unit 100 stores a user management DB **100*a* which manages various kinds of information regarding the user, a tipster management DB 100*b* which manages various kinds of information regarding the tipster, and a video management DB 100*c*** which stores a captured video of the tipster, or the like.

FIG. 4 illustrates an example of the user management DB **100*a* and the tipster management DB 100*b* according to the first embodiment. An identifier for uniquely identifying the user within the server 10 is stored in a "user ID" of the user management DB 100*a***. A nickname input by the user upon registration of the user is stored in a "nickname". An amount of a predetermined value possessed by the user is stored in a "possessed value". A betting ticket for which the user makes a bet or a bet predetermined value are stored in "betting history" for each race.

An identifier for uniquely identifying the tipster (including a group of tipsters) within the server 10 is stored in a "tipster ID" of the tipster management DB 100*b*. A nickname of the tipster is stored in a "nickname". An amount of a predetermined value possessed by the tipster is stored in a "possessed value". The betting ticket tipped by the tipster and a predetermined value which is to be bet or which is bet for a race to be held hereafter are stored in "tip". Note that the race to be held hereafter is not limited to a race to be held immediately or held on the day, and the tip includes tip for a race to be held in the future such as a race to be held next day. In the example of FIG. 4, content of types of betting and betting targets tipped by teams A to C and amounts of predetermined values to be bet are stored for a fifth race. Information indicating time at which tip of the betting ticket is accepted from the tipster is stored in "tip acceptance time". A betting ticket for which the tipster makes a bet and a predetermined value used for purchasing the betting ticket are stored in "betting history" for each race for a race which has already finished.

Video data of a captured video of an aspect where the tipster tips a race result, an aspect where the tipster explains his/her tip, or the like, is stored in the video management DB 100*c*. The captured video is transmitted from the server 10 to the terminal 20 in real time. Further, the server 10 stores the video also in the video management DB to support a case where the user desires to watch the past video.

The display control unit 101 (transmission unit) performs various kinds of processing necessary for causing the captured video of the aspect where the tipster tips the race result, the aspect where the tipster explains his/her tip, or the like, an image indicating the betting ticket tipped by the tipster, a screen for accepting input of a predetermined value to be bet from the user, or the like, to be displayed on a display of the terminal 20. The display control unit 101 transmits data for displaying various kinds of screens to the terminal 20 in response to access from a Web browser of the terminal 20 or in response to access from a dedicated application installed at the terminal 20.

Further, the display control unit 101 transmits data of a video including one or more pieces of tip information in which information (such as names and identifiers of tipsters) which specifies one or more tipsters is associated with betting tickets (betting targets and types of betting) accepted from the tipsters, to the terminal 20 (another information processing apparatus) to be utilized by the user (second player).

Further, in a case where a predetermined instruction is received from the user, the display control unit 101 may acquire from the video management DB, data of a video which is started from a timing including at least time at which tip of the betting ticket is accepted from the tipster and transmit the data to the terminal 20 to be utilized by the user.

The first acceptance unit 102 accepts designation of betting targets and types of betting tipped by the tipsters from one or more tipsters (first players).

The tip information may be characters indicating the name or the identifier of the tipster and the betting ticket tipped by the tipster. Alternatively, the tip information may be an image (for example, an image indicating a flip board) including the name or the identifier of the tipster and the betting ticket tipped by the tipster. The video may be any video and can include, for example, a captured video of an aspect where each tipster tips a race result, a video of an aspect where each tipster explains his/her tip after presenting tip information at the same time by an instruction by a presenter. Further, the video may be a video in which the tip information respectively corresponding to the one or more tipsters is displayed in predetermined regions allocated for each tipster in the video.

The second acceptance unit 103 accepts from the terminal 20, tip information which is selected by the user among the one or more pieces of tip information included in the video. Further, the second acceptance unit 103 may further accept designation of a predetermined value when the second acceptance unit 103 accepts from the terminal 20, the tip information selected by the user. Still further, in a case where the tip information includes a plurality of betting tickets, the second acceptance unit 103 may accept from the terminal 20, designation of a betting ticket for which a predetermined value is to be bet.

The betting processing unit 104 processes betting by the user on the basis of the betting ticket corresponding to the tip information selected by the user. Further, the betting processing unit 104 may bet the designated predetermined value for the betting ticket (the betting target and the type of betting) corresponding to the tip information selected by the user. Further, in a case where the tip information includes a plurality of betting tickets, the betting processing unit 104 may bet the designated predetermined value for the betting ticket designated by the user among the plurality of betting tickets included in the tip information.

<Processing Procedure>

Figure 5:
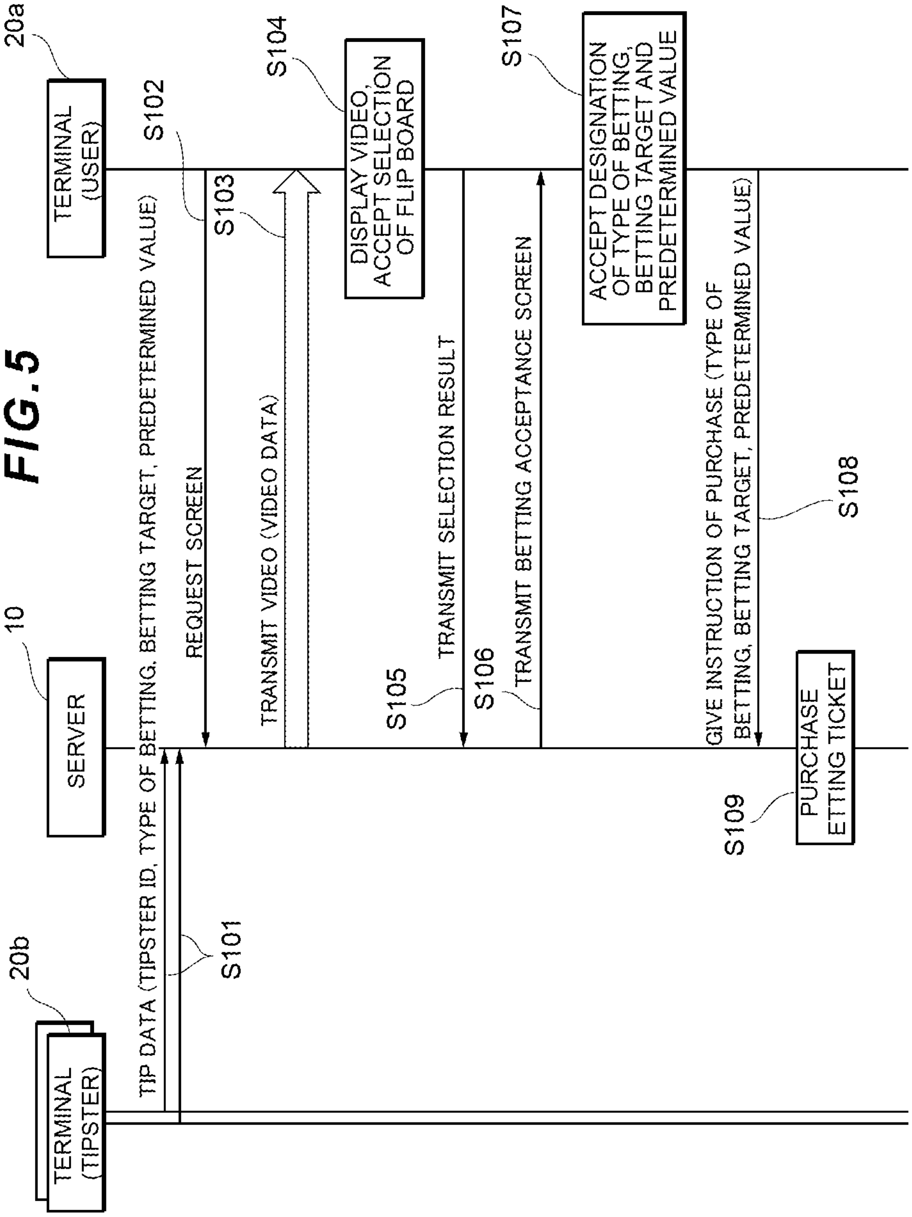
FIG. 5 is a sequence diagram illustrating an example of processing procedure to be performed by the betting system according to the first embodiment.
Figure 6:
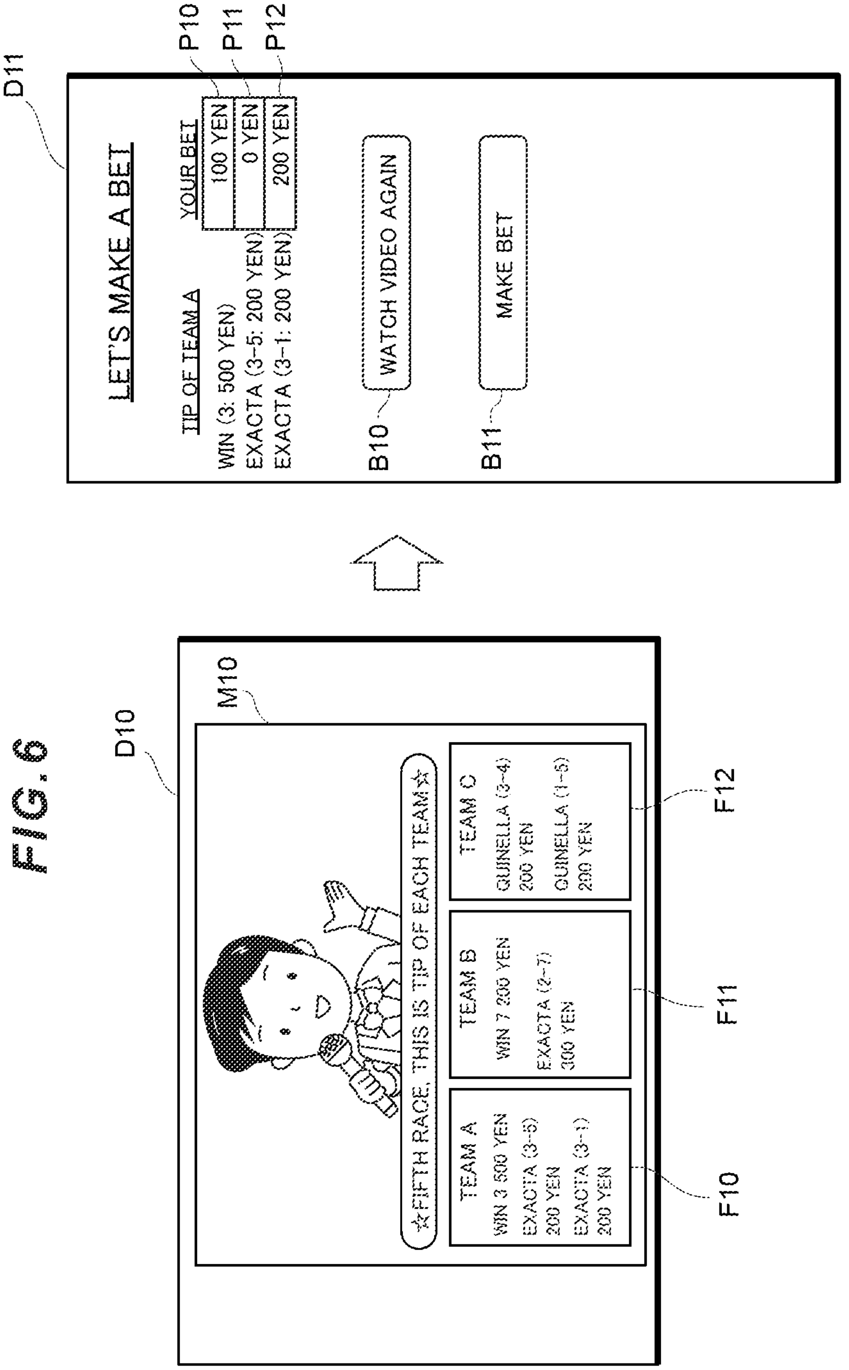
FIG. 6 is a view illustrating a screen display example according to the first embodiment.

FIG. 5 is a sequence diagram illustrating an example of processing procedure to be performed by the betting system 1 according to the first embodiment. FIG. 6 is a view illustrating an example of a screen to be displayed at the terminal 20. Processing procedure to be performed by the server 10 and the terminal 20 will be specifically described using FIG. 5 and FIG. 6. Note that in FIG. 5, a terminal to be utilized by the user is described as a terminal 20*a*, and a terminal to be utilized by the tipster is described as a terminal 20*b*. While there may be any number of tipsters, it is assumed in the example of FIG. 5 that there are a plurality of tipsters. Further, it is assumed in the example of FIG. 5 and FIG. 6 that the tip information to be displayed in the video data includes names of the tipsters, the betting tickets tipped by the tipsters, and an image indicating a flip board on which amounts of predetermined values to be bet are described. Further, it is assumed that the video to be displayed at the terminal 20*a* is a captured video of an aspect where a plurality of tipsters tip betting tickets under instruction of a presenter and explain why they tip the betting tickets in a shooting studio. Further, each tipster can transmit details of the tip (the tipped betting ticket and the amount of the predetermined value to be bet) to the server 10 by inputting the details of the tip to the terminal 20*b* during shooting of the video.

In step S101, each terminal 20*b* transmits tip data indicating details of the tip input by each tipster to the server 10. The tip data includes a tipster ID of the tipster, the betting ticket (the type of betting and the betting target) tipped by the tipster, and the predetermined value to be bet by the tipster. The first acceptance unit 102 of the server 10 accepts the betting ticket tipped by the tipster and the predetermined value to be bet from each terminal 20*b* and stores them in a "tip" field of each tipster in the tipster management DB 100*b*. Further, the first acceptance unit 102 stores time at which the betting ticket tipped by each tipster and the predetermined value to be bet are accepted in a "tip acceptance time" field of each tipster.

In step S102, the terminal 20*a* to be utilized by the user transmits a message of requesting transmission of a betting screen to the server 10. The message is transmitted, for example, at a timing at which a Web browser or a dedicated application is activated at the terminal 20*a*. Note that the processing procedure in step S102 may be performed prior to the processing procedure in step S101.

In step S103, the display control unit 101 of the server 10 transmits the video data to the terminal 20*a*. While the video data is assumed to be, for example, video data captured with a video camera provided at a shooting studio and transmitted to the server 10, the video data is not limited to this. For example, the video data may be video data which is captured with a camera provided at the terminal 20*b* to be utilized by one of the tipsters and transmitted from the terminal 20*b* to the server 10. Note that the storage unit 100 accumulates the captured video data in the video management DB 100*c* along with a time stamp.

In step S104, the terminal 20*a* displays the video data received from the server 10 on the display. The flip boards corresponding to the respective tipsters are displayed on the display of the terminal 20*a* along with the video, so that the user can recognize which tipster bets for which betting ticket by viewing the flip boards. Further, the user can select a tipster with whom the user desires to share by selecting one flip board from the plurality of flip boards displayed on the display.

A screen D10 in FIG. 6 is an example of a screen on which a video is displayed. A video of the presenter and the tipsters is displayed in a display area M10 included in the screen D10. Further, a plurality of flip boards F10 to F12 are arranged in a predetermined direction (for example, a lateral direction) and displayed in the video data. Further, a nickname of the tipster, a betting ticket tipped by the tipster and an amount of money to be bet (an amount of a predetermined value) are displayed in each flip board.

Here, the flip board may be part of the video. For example, a captured video of an aspect where the tipsters present the flip boards on which tips are written at the same time toward the camera with a call of "let's see everyone's tip" by the presenter may be displayed at the terminal 20*a*. In this case, the display control unit 101 transmits information indicating positions where the flip boards of the respective tipsters are displayed on the screen of the terminal 20*a* to the terminal 20*a* along with the video data or in advance. The terminal 20*a* can recognize the flip board of the tipster selected by the user by comparing a position where the user touches the display and the information indicating the positions where the flip boards of the respective tipsters are displayed, received from the server 10.

Further, the flip boards may be displayed in a superimposed manner on the video. In this case, the server 10 transmits tip data including identifiers (tipster IDs) for identifying for the respective tipsters, the betting tickets tipped by the respective tipsters, and amounts of money (amounts of the predetermined values) to be bet to the terminal 20*a*. Further, the terminal 20*a* generates images (flip boards F10 to F12) of the flip boards of the respective tipsters using the tip data received from the server 10 and displays the generated images in a superimposed manner on the video. Further, the server 10 may transmit instruction information which gives an instruction of a timing for displaying the images of the flip boards in a superimposed manner on the video, to the terminal 20*a*. Further, the terminal 20*a* may display the images of the flip boards in a superimposed manner on the video at a timing indicated in the instruction information. The timing may be, for example, a timing at which the presenter calls out "let's see everyone's tip". An administrator, or the like, of the server 10 may instruct the server 10 to transmit the instruction information to the terminal 20*a* while listening to speech of the presenter. Further, the tip data to be transmitted from the server 10 to the terminal 20*a* includes position information indicating positions where the images of the flip boards of the respective tipsters are to be displayed in the display area M10, and the terminal 20 may display the images of the flip boards in a superimposed manner at the positions indicated by the position information in the display area M10. The terminal 20*a* can recognize the flip board of the tipster selected by the user by comparing a position where the user touches the display and the position information received from the server 10. Description will be continued by returning to FIG. 5.

In step S105, in a case where the user selects a flip board, the terminal 20*a* transmits information (for example, the tipster ID of the tipster corresponding to the flip board) indicating the flip board selected by the user to the server 10. The second acceptance unit 103 of the server 10 accepts the information indicating the flip board selected by the user.

In step S106, the display control unit 101 of the server 10 accesses the tipster management DB 100*b* and acquires the betting ticket tipped by the tipster and the amount of the predetermined value to be bet from the "tip" field of the tipster corresponding to the flip board selected by the user. Further, the display control unit 101 transmits to the terminal 20*a*, a message including data for displaying a betting acceptance screen for accepting designation of a betting ticket for which a predetermined value is to be bet and the predetermined value to be bet from the user.

In step S107, the terminal 20*a* accepts designation of the betting ticket for which the predetermined value is to be bet and the predetermined value to be bet from the user. A screen D11 in FIG. 6 is an example of the betting acceptance screen. The betting ticket for which the tipster is to make a bet and the predetermined value to be bet by the tipster corresponding to the flip board selected in the screen D10 are arranged and displayed on the screen D11. Input areas P10 to P12 for allowing input of predetermined values to be bet are displayed for each betting ticket on the screen D11. If the predetermined values to be bet are input in the input areas P10 to P12 and a betting execution button B11 is depressed, the terminal 20*a* executes processing procedure in S108 in FIG. 5. Note that it is also possible that, if "0" is input in a field of the predetermined value, a bet is not made for the betting ticket corresponding to the field of the predetermined value.

Here, a case is assumed where the user desires to confirm again the reason why the tipster tips the betting target before actually making a bet. In this case, the user can watch the video at the time when the tipster makes the tip again by depressing a button B10 on the screen D11.

If the button B10 is depressed, the terminal 20*a* transmits a video request message including the tipster ID of the tipster to the server 10. When the display control unit 101 of the server 10 accepts the message, the display control unit 101 accesses the tipster management DB 100*b* and acquires time stored in the "tip acceptance time" field corresponding to the accepted tipster ID. Subsequently, the display control unit 101 of the server 10 reads out video data which is started from a timing including the acquired time from the video management DB 100*c* and transmits the video data to the terminal 20*a*. The timing including the acquired time may be, for example, a timing which is the same time as the acquired time or may be a timing a predetermined period before the acquired time. The terminal 20*a* displays the received video data on the display. Description will be continued by returning to FIG. 5.

In step S108, the terminal 20*a* transmits to the server 10, a purchase instruction message including the betting ticket for which the predetermined value is to be bet and the predetermined value to be bet for each betting ticket, which are input on the screen D11. The second acceptance unit 103 of the server 10 accepts designation of the betting ticket for which the user is to make a bet and designation of the predetermined value to be bet.

In step S109, the betting processing unit 106 of the server 10 performs processing of betting the designated predetermined value for the betting ticket notified from the terminal 20*a* (that is, processing of purchasing the betting ticket). The processing may be executed by the betting processing unit 106 requesting betting of the predetermined value to another information processing apparatus of an association which conducts the race.

Second Embodiment

Subsequently, a second embodiment will be described. In the first embodiment, the user selects one flip board among the flip boards of the respective tipsters displayed on the screen of the terminal 20*a* and bets a predetermined value for the betting ticket displayed on the flip board. On the other hand, in the second embodiment, the user selects one video among videos of the respective tipsters displayed on the screen of the terminal 20*a* and bets a predetermined value for the betting ticket tipped by the tipster corresponding to the selected video. The second embodiment may be the same as the first embodiment in other points which are not particularly noted.

<Functional Block Configuration>

A functional block configuration of the server 10 according to the second embodiment will be described using FIG. 3.

The second acceptance unit 103 (acceptance unit) accepts from the user (player), designation of one video (distributed video) among videos (one or more distributed videos) for each tipster displayed on the screen of the terminal 20 to be utilized by the user.

The display control unit 101 causes the video designated by the user and tip information including a betting ticket (a betting target and a type of betting) associated with the video to be displayed on the display (display unit) of the terminal 20 (information processing apparatus) to be utilized by the user.

Further, the display control unit 101 may cause a screen including a video display region where the video designated by the user is displayed and a first input region for allowing input of betting based on the betting ticket included in the tip information to be displayed at the display unit of the terminal 20 to be utilized by the user. The first input region may include a bet amount setting region for setting a predetermined value to be bet (bet amount) for each betting ticket.

Further, in a case where predetermined operation input is accepted, the display control unit 101 may cause a video different from the distributed video designated by the user to be displayed in the video display region and cause a second input region for allowing input of betting other than the betting ticket included in the tip information to be displayed.

The betting processing unit 104 performs betting of the user on the basis of the betting ticket included in the tip information associated with the video. Further, the betting processing unit 104 may perform betting of the user on the basis of information input in the first input region.

<Processing Procedure>

Figure 7:
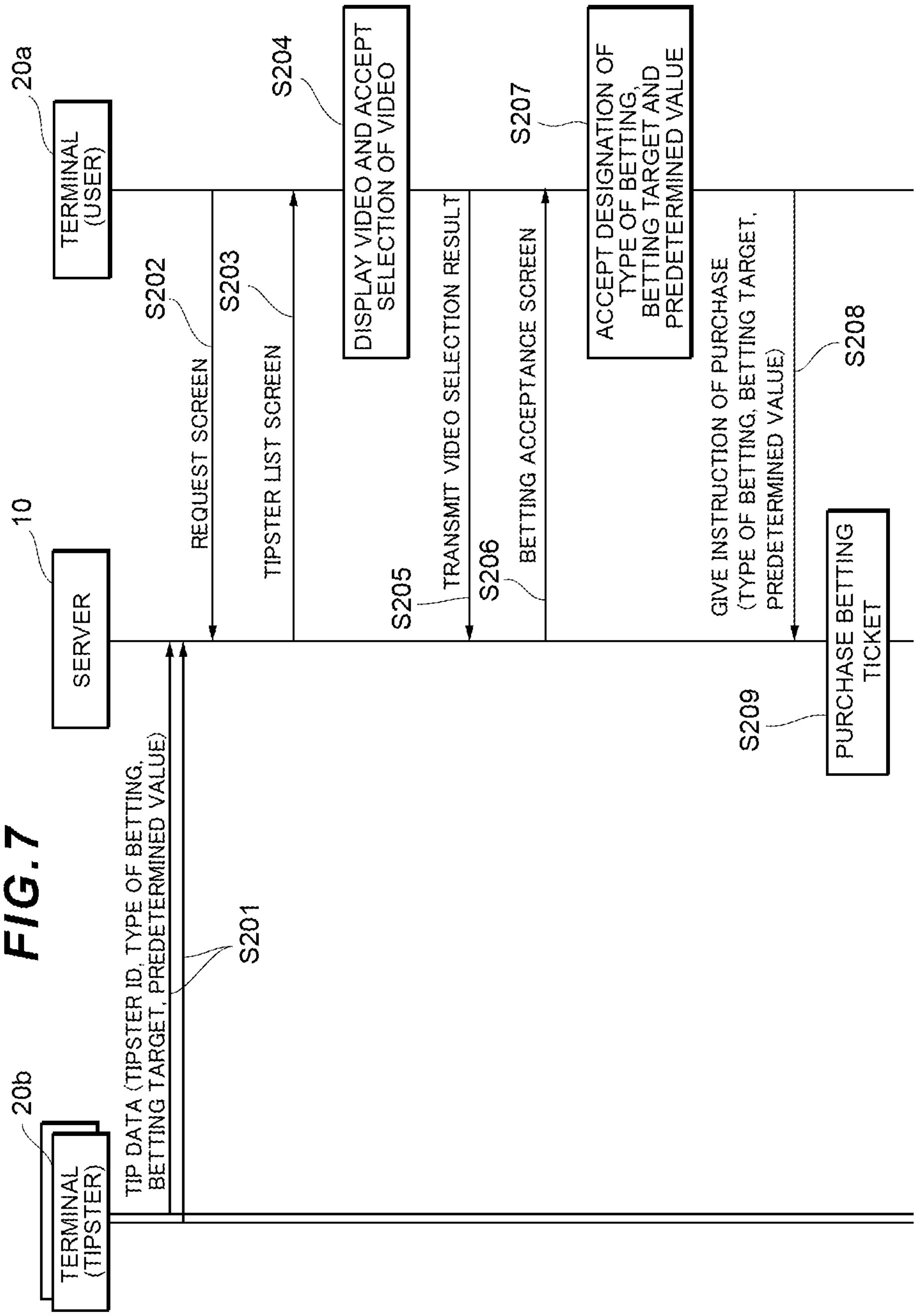
FIG. 7 is a sequence diagram illustrating an example of processing procedure to be performed by a betting system according to a second embodiment.
Figure 8:
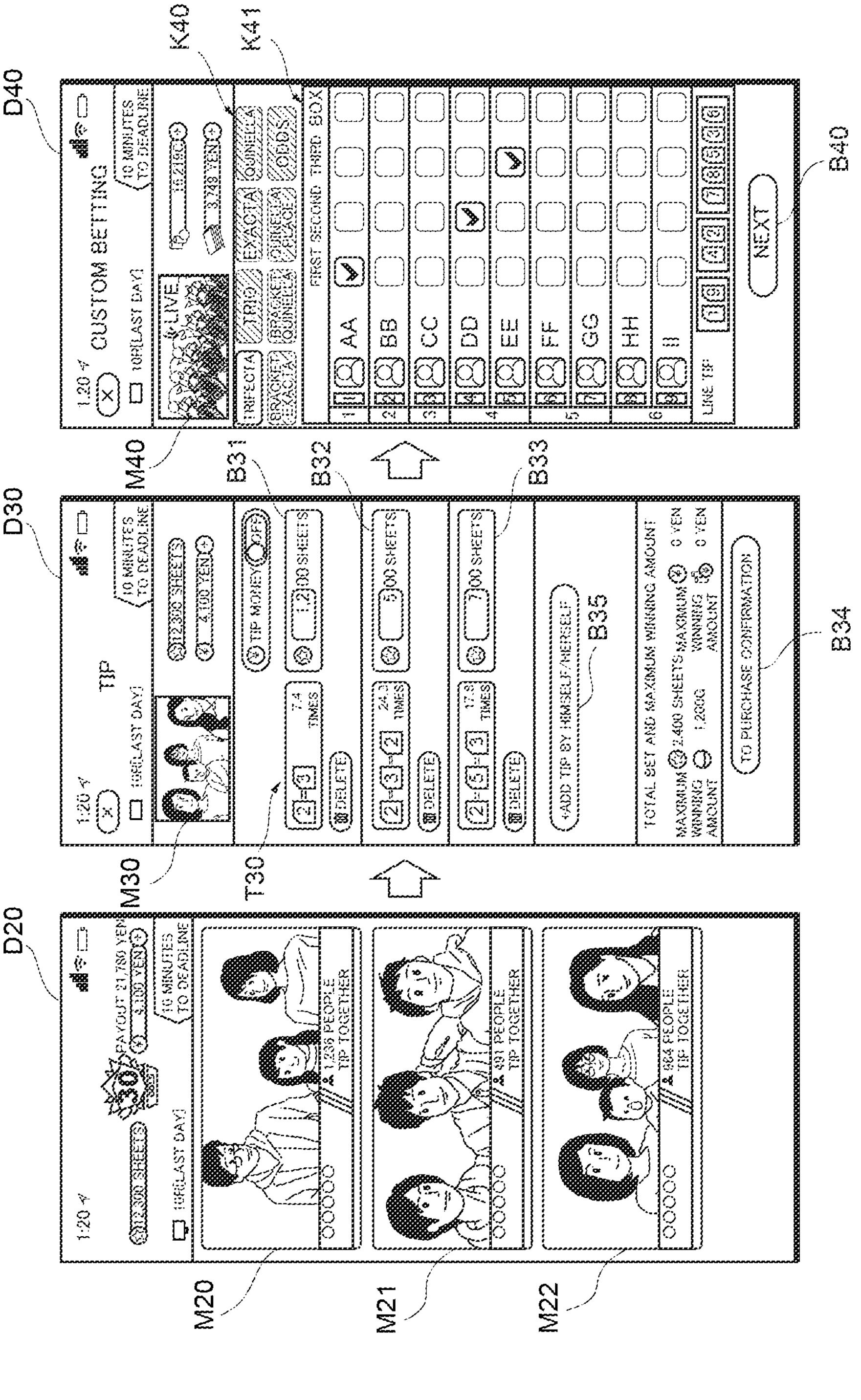
FIG. 8 is a view illustrating a screen display example according to the second embodiment.

FIG. 7 is a sequence diagram illustrating an example of processing procedure to be performed by the betting system 1 according to the second embodiment. FIG. 8 is a view illustrating an example of a screen to be displayed at the terminal 20. Processing procedure to be performed by the server 10 and the terminal 20 will be specifically described using FIG. 7 and FIG. 8. Note that in FIG. 7, a terminal to be utilized by the user is described as a terminal 20*a*, and a terminal to be utilized by the tipster is described as a terminal 20*b*. While there may be any number of tipsters, it is assumed in the example in FIG. 7 that there are a plurality of tipsters.

In step S201, each terminal 20*b* transmits tip data indicating content of tip input by each tipster to the server 10. The tip data includes a tipster ID of the tipster, a betting ticket (a type of betting and a betting target) tipped by the tipster, and a predetermined value to be bet by the tipster. The first acceptance unit 102 of the server 10 accepts the betting ticket tipped by the tipster and the predetermined value to be bet from each terminal 20*b* and stores them in a "tip" field of each tipster in the tipster management DB 100*b*. Further, the first acceptance unit 102 stores time at which the betting ticket tipped by each tipster and the predetermined value to be bet are accepted in a "tip acceptance time" field of each tipster. Note that the processing procedure in step S201 may be omitted. In this case, each tipster may notify an administrator, or the like, who administers the server 10 of the betting ticket which is tipped in advance using some kind of methods (such as, for example, by e-mail or by phone) in advance. Further, the administrator, or the like, may store the betting ticket notified from each tipster in the tipster management DB 100*b*.

The processing procedure in step S202 is the same as the processing procedure in step S102 in FIG. 5, and thus, description will be omitted.

In step S203, the display control unit 101 of the server 10 transmits a tipster list screen to the terminal 20*a*. In the tipster list screen, captured videos of aspects where the tipsters make the tips, which are captured with, for example, a video camera provided at a shooting studio or cameras provided at the terminals 20*b* to be utilized by the tipsters and transmitted to the server 10, are arranged for each tipster and displayed. Note that the storage unit 100 accumulates the captured video data in the video management DB 100*c* along with a time stamp.

In step S204, the terminal 20*a* displays the tipster list screen received from the server 10 on the display. A list of the videos of the tipsters is displayed on the display of the terminal 20*a*, and the user selects a tipster with whom the user shares by watching the videos of the respective tipsters.

A screen D20 in FIG. 8 is an example of the tipster list screen. Videos of aspects where the tipsters tip a race result are respectively displayed in video display regions M20, M21 and M22 included in the screen D20. Further, in addition to the video, names of the tipsters, the number of users who share with the tipsters and comments of the tipsters are displayed in the video display regions M20, M21 and M22. Here, videos of different video distributors are displayed in the video display regions M20, M21 and M22.

In step S205, the terminal 20*a* transmits to the server 10, information (such as, for example, an ID of the video and a tipster ID of a tipster corresponding to the video) indicating the video selected (designated) by the user. The second acceptance unit 103 of the server 10 accepts the information indicating the video selected by the user.

In step S206, the display control unit 101 of the server 10 accesses the tipster management DB 100*b* and acquires the betting ticket tipped by the tipster or the betting ticket and the amount of the predetermined value to be bet from the "tip" field of the tipster corresponding to the video selected by the user. Further, the display control unit 101 transmits to the terminal 20*a*, a message including data for displaying a betting acceptance screen for accepting input of a betting ticket for which the predetermined value is to be bet and the predetermined value to be bet from the user. The video selected by the user and tip information including the betting ticket (that is, the betting ticket tipped by the tipster) associated with the video are displayed on the betting acceptance screen.

In step S207, the terminal 20*a* accepts designation of the betting ticket for which the predetermined value is to be bet and the predetermined value to be bet from the user on the betting acceptance screen. A screen D30 in FIG. 8 is an example of the betting acceptance screen. The screen D30 includes a video display region M30 on which the video selected (designated) by the user is displayed and a first input region T30 for allowing input of betting based on the betting ticket included in the tip information corresponding to the video. Further, the first input region T30 includes bet amount setting regions (B31 to B33) for designating predetermined values to be bet for each betting ticket (setting bet amounts for each betting ticket). Note that the predetermined values to be bet by the tipster may be displayed in advance in the bet amount setting regions (B31 to B33), and the user may be able to arbitrarily change the predetermined values.

The screen D30 indicates an example of a screen to be displayed in a case where the video display region M22 is selected on the screen D20. Three betting tickets (2=3, 5-3-2, 2=5=3) displayed in the first input region T30 are betting tickets tipped by the tipster appearing in the video display region M22. Odds for each betting ticket may be displayed in the first input region T30. The video displayed in the video display region M22 on the screen D20 may be continuously displayed in the video display region M30. If the predetermined values to be bet are input in the bet amount setting regions (B31 to B33) and a betting execution button B34 is depressed, the terminal 20*a* executes processing procedure in step S208 in FIG. 7. Note that it is also possible that, if "0" is input in a field of the predetermined value, a bet is not made for the betting ticket corresponding to the field of the predetermined value. In this manner, the user can make a bet for the betting ticket selected from the betting tickets tipped by the tipsters while browsing the video of the tipster reproduced in the video display region M22 on the screen D30. Further, one or more of currency, paid points, charge-free points, and the like, may be able to be selected and set as the predetermined value to be set in the bet amount setting region.

If the button B35 is depressed on the screen D30 (that is, the second acceptance unit 103 of the server 10 accepts predetermined input operation), the screen transitions to a screen D40. The video display region M40 and second input regions (a region K40 and a region K41) for allowing input of betting tickets tipped by the user himself/herself (input of betting other than the betting targets and the types of betting included in the tip information) are displayed on the screen D40. A video different from the video of the tipster displayed in the video display region M30 on the screen D30 (such as, for example, an aspect where a player prepares for a race) is displayed in the video display region M40. In this manner, the display control unit 101 of the server 10 changes content of the video to be displayed in the video display region in accordance with display content of the input regions for accepting betting information from the user.

The region K40 among the second input regions is a region for allowing input of a type of betting, and the region K41 is a region for allowing input of betting targets. For example, in a case where trifecta of selecting number 1 to finish first, number 4 to finish second, and number 5 to finish third is input, "trifecta" is designated in the region K40, and number 1, 4 and 5 are respectively designated as players to finish first, second and third in the region K41. If the button B40 is depressed, the screen returns to the screen D30. The betting ticket designated on the screen D40 and the bet amount setting region for the added betting ticket to be bet are additionally displayed in the first input region T30 on the screen D30.

In step S208, the terminal 20*a* transmits to the server 10, a purchase instruction message including the betting ticket for which the predetermined value is to be bet and the predetermined value to be bet for each betting ticket, input on the screen D30. The second acceptance unit 103 of the server 10 accepts designation of the betting ticket for which the user makes a bet and designation of the predetermined value to be bet.

In step S209, the betting processing unit 106 of the server 10 performs processing of betting the designated predetermined value for the betting ticket notified from the terminal 20*a* (that is, processing of purchasing the betting ticket). The processing may be executed by the betting processing unit 106 requesting betting of the predetermined value to another information processing apparatus of the association which conducts the race.

CONCLUSION

According to the embodiments described above, the user can select the flip board displayed on the screen of the terminal 20 and can bet the predetermined value for the betting ticket displayed on the flip board. By this means, it is possible to provide a technique which enables even a user having little experience in betting to easily make a bet.

The above-described embodiments are provided to facilitate understanding of the present invention and are not intended to limit interpretation of the present invention. The flowcharts, sequences, components included in the embodiments and arrangement thereof, materials, conditions, shapes, sizes, and the like, described in the embodiments are not limited to the examples and can be changed as appropriate. Further, the components described in different embodiments can be partially replaced or combined.

Supplementary Notes

[Supplementary Note 1]

An information processing apparatus that executes processing regarding betting on a betting target, the information processing apparatus including a first acceptance unit configured to accept designation of betting targets and types of betting from one or more first players, a transmission unit configured to transmit data of a video including one or more pieces of tip information in which information specifying the first players is associated with the betting targets and the types of betting accepted from the first players, to another information processing apparatus to be utilized by a second player, a second acceptance unit configured to accept tip information selected by the second player among the one or more pieces of tip information included in the video, from the other information processing apparatus, and a betting processing unit configured to perform betting of the second player on the basis of a betting target and a type of betting corresponding to the selected tip information.

According to supplementary note 1, it is possible to provide a technique which enables even a user having little experience in betting to easily make a bet.

[Supplementary Note 2]

The information processing apparatus according to supplementary note 1, in which the video is a video in which the pieces of tip information respectively corresponding to the one or more first players are displayed in predetermined regions respectively allocated for the first players in the video.

According to supplementary note 2, it is possible to distinctively display the tip information within the video for each tipster.

[Supplementary Note 3]

The information processing apparatus according to supplementary note 1 or 2, in which the second acceptance unit accepts designation of a predetermined value upon acceptance of the selected tip information, and the betting processing unit bets the designated predetermined value in association with the betting target and the type of betting corresponding to the selected tip information.

According to supplementary note 3, the user can select a betting ticket tipped by the tipster and can bet the predetermined value for the selected betting ticket, so that the user can easily make a bet.

[Supplementary Note 4]

The information processing apparatus according to any one of supplementary note 1 to 3, further including a storage unit configured to store information indicating time at which the betting targets and the types of betting are accepted from the first players, in which in a case where a predetermined instruction is received from the second player, the transmission unit transmits the data of the video which is started from a timing including at least the time to the other information processing apparatus.

According to supplementary note 4, the user can confirm the video at the time when the tipster makes the tip again.

[Supplementary Note 5]

An information processing method to be performed by an information processing apparatus that executes processing regarding betting on a betting target, the information processing method including a step of accepting designation of betting targets and types of betting from one or more first players, a step of transmitting data of a video including one or more pieces of tip information in which information specifying the first players is associated with the betting targets and the types of betting accepted from the first players, to another information processing apparatus to be utilized by a second player, a step of accepting tip information selected by the second player among the one or more pieces of tip information included in the video, from the other information processing apparatus, and a step of performing betting of the second player on the basis of a betting target and a type of betting corresponding to the selected tip information.

According to supplementary note 5, it is possible to provide a technique which enables even a user having little experience in betting to easily make a bet.

[Supplementary Note 6]

A program for causing a computer that executes processing regarding betting on a betting target to execute a step of accepting designation of betting targets and types of betting from one or more first players, a step of transmitting data of a video including one or more pieces of tip information in which information specifying the first players is associated with the betting targets and the types of betting accepted from the first players, to another information processing apparatus to be utilized by a second player, a step of accepting tip information selected by the second player among the one or more pieces of tip information included in the video, from the other information processing apparatus, and a step of performing betting of the second player on the basis of a betting target and a type of betting corresponding to the selected tip information.

According to supplementary note 6, it is possible to provide a technique which enables even a user having little experience in betting to easily make a bet.

[Supplementary Note 7]

An information processing apparatus that executes processing regarding betting on a betting target, the information processing apparatus including an acceptance unit configured to accept designation of a distributed video among one or more distributed videos, from a player, a display control unit configured to cause the designated distributed video and tip information including a betting target and a type of betting associated with the distributed video to be displayed at a display unit of an information processing apparatus of the player, and a betting processing unit configured to perform betting of the player on the basis of the betting target and the type of betting included in the tip information.

According to supplementary note 7, even a user having little experience in betting can easily make a bet on the basis of the tip information associated with the displayed distributed video.

[Supplementary Note 8]

The information processing apparatus according to supplementary note 7, in which the display control unit causes a screen including a video display region in which the designated distributed video is displayed and a first input region for allowing input of betting based on the betting target and the type of betting included in the tip information, to be displayed at the display unit, the first input region includes a bet amount setting region for setting a bet amount for each betting target and each type of betting, and the betting processing unit performs the betting of the player on the basis of information input in the first input region.

According to supplementary note 8, the user can select the betting target and the type of betting tipped by the tipster and can bet a predetermined value for the selected betting ticket, so that the user can easily make a bet.

[Supplementary Note 9]

The information processing apparatus according to supplementary note 8, in which in a case where predetermined operation input is accepted, the display control unit causes a video different from the designated distributed video to be displayed in the video display region and causes a second input region for allowing input of betting other than the betting target and the type of betting included in the tip information to be displayed.

According to supplementary note 9, the user can bet on a betting target and a type of betting different from the tip by the tipster.

[Supplementary Note 10]

An information processing method regarding betting on a betting target, the information processing method including a step of accepting, by a computer, designation of a distributed video among one or more distributed videos, from a player, a step of causing, by the computer, the designated distributed video and tip information including a betting target and a type of betting associated with the distributed video to be displayed at a display unit of an information processing apparatus of the player, and a step of performing, by the computer, betting of the player on the basis of the betting target and the type of betting included in the tip information.

According to supplementary note 10, even a user having little experience in betting can easily make a bet on the basis of the tip information associated with the displayed distributed video.

[Supplementary Note 11]

A program for causing a computer that executes processing regarding betting on a betting target to execute a step of accepting designation of a distributed video among one or more distributed videos, from a player, a step of causing the designated distributed video and tip information including a betting target and a type of betting associated with the distributed video to be displayed at a display unit of an information processing apparatus of the player, and a step of performing betting of the player on the basis of the betting target and the type of betting included in the tip information.

According to supplementary note 11, even a user having little experience in betting can easily make a bet on the basis of the tip information associated with the displayed distributed video.

The invention claimed is:

1. An information processing method to be performed by an information processing apparatus that executes processing regarding betting on a betting target, the information processing method comprising:

- a step of accepting tip information including betting targets and types of betting from a plurality of first players;
- a step of transmitting, to another information processing apparatus to be utilized by a second player, data of a video including a plurality of flip boards on which respective information of the plurality of first players is displayed and position information indicating positions where the plurality of flip boards are displayed, the position information is displayed on a screen of other information processing apparatus;
- a step of accepting tip information selected by the second player among the tip information of each of the plurality of first players, from the other information processing apparatus; and
- a step of performing betting of the second player on a basis of a betting target and a type of betting corresponding to the selected tip information.

2. The information processing method according to claim 1, wherein the video is a video in which pieces of tip information respectively corresponding to the plurality of first players are displayed in predetermined regions respectively allocated for the first players in the video based on the position information.

3. The information processing method according to claim 1, further comprising:

- a step of accepting designation of a predetermined value upon acceptance of the selected tip information, and
- a step of betting the designated predetermined value in association with the betting target and the type of betting corresponding to the selected tip information.

4. The information processing method according to claim 1, further comprising:

- a step of storing, in a memory, information indicating time at which the betting targets and the types of betting are accepted from the first players,
- in a case where a predetermined instruction is received from the second player, a step of transmitting the data of the video which is started from a timing including at least the time to the other information processing apparatus.

5. An information processing apparatus that executes processing regarding betting on a betting target, the information processing apparatus comprising:

- a first acceptance unit configured to accept tip information including betting targets and types of betting from a plurality of first players;
- a transmission unit configured to transmit, to another information processing apparatus to be utilized by a second player, data of a video including a plurality of flip boards on which respective tip information of the plurality of first players is displayed and position information indicating the positions where the plurality of flip boards are displayed, the position information is displayed on a screen of other information processing apparatus;
- a second acceptance unit configured to accept tip information selected by the second player among the tip information of each of the plurality of first players, from the other information processing apparatus; and
- a betting processing unit configured to perform betting of the second player on a basis of a betting target and a type of betting corresponding to the selected tip information.

6. The information processing apparatus according to claim 5, wherein the video is a video in which pieces of tip information respectively corresponding to the plurality of first players are displayed in predetermined regions respectively allocated for the first players in the video based on the position information.

7. The information processing apparatus according to claim 5, wherein the second acceptance unit accepts designation of a predetermined value upon acceptance of the selected tip information, and the betting processing unit bets the designated predetermined value in association with the betting target and the type of betting corresponding to the selected tip information.

8. The information processing apparatus according to claim 5, further comprising:

- a storage unit configured to store information indicating time at which the betting targets and the types of betting are accepted from the first players, wherein in a case where a predetermined instruction is received from the second player, the transmission unit transmits the data of the video which is started from a timing including at least the time to the other information processing apparatus.

* * * * *